E. M. HEYLMAN AND A. D. GALLAGHER.
PLOW.
APPLICATION FILED OCT. 17, 1919.
1,386,870.
Patented Aug. 9, 1921.
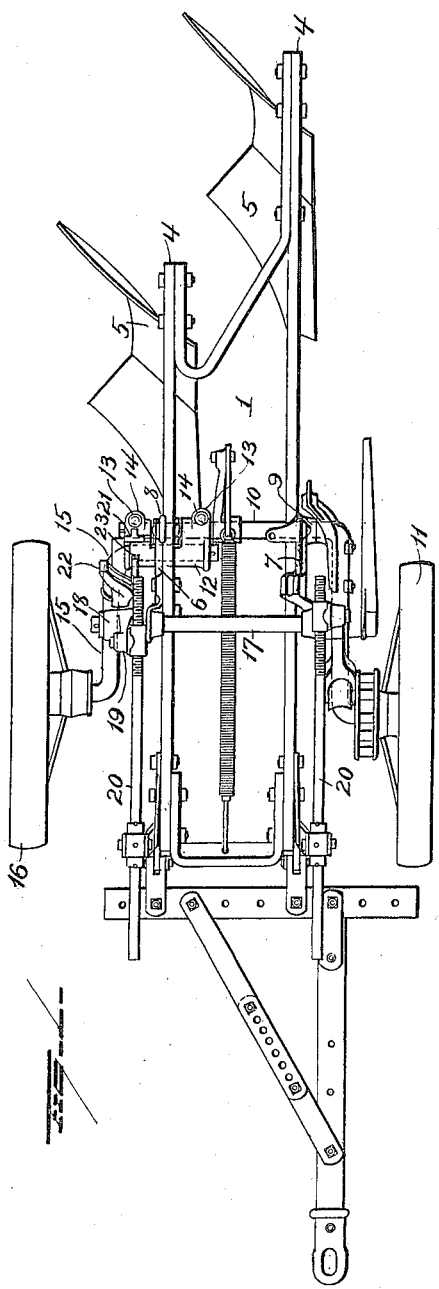
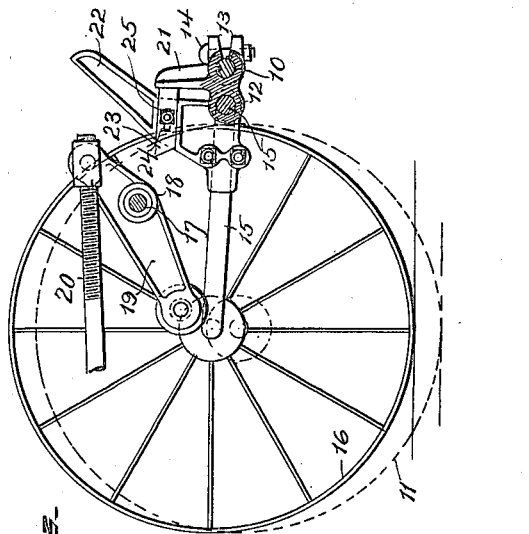
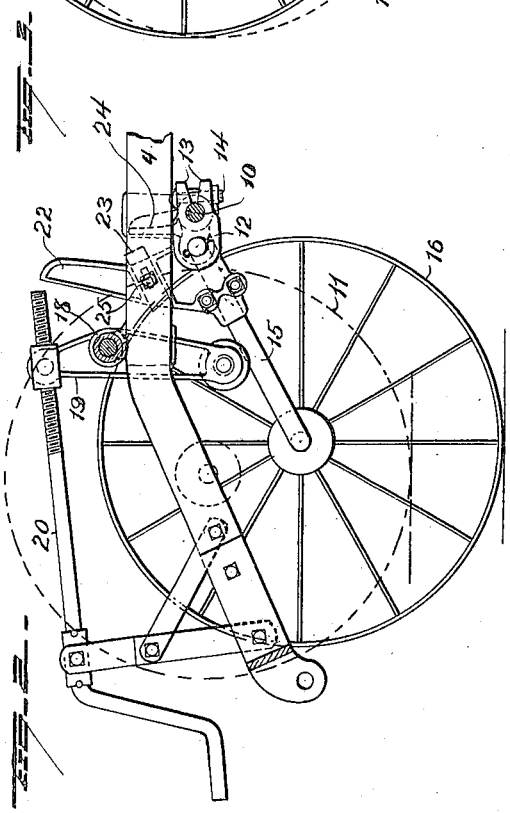
INVENTOR
E. M. Heylman and
A. D. Gallagher
Seymour & Bright  Attorneys

UNITED STATES PATENT OFFICE.

EDWARD M. HEYLMAN AND ARTHUR D. GALLAGHER, OF SOUTH BEND, INDIANA, ASSIGNORS TO OLIVER CHILLED PLOW WORKS, OF SOUTH BEND, INDIANA.

PLOW.

1,386,870.   Specification of Letters Patent.   Patented Aug. 9, 1921.

Application filed October 17, 1919. Serial No. 331,290.

*To all whom it may concern:*

Be it known that we, EDWARD M. HEYLMAN and ARTHUR D. GALLAGHER, citizens of the United States, and residents of South Bend, in the county of St. Joseph and State of Indiana, have invented certain new and useful Improvements in Plows; and we do hereby declare the following to be a full, clear, and exact description of the invention, such as will enable others skilled in the art to which it appertains to make and use the same.

This invention relates to improvements in plows and more particularly to stop and adjusting devices associated with the same,— one object of the invention being to provide, in a plow structure having two independently movable crank axles, means which will operate to prevent one of said axles from "kicking back" far enough to cause its crank to become disposed at a reverse angle to that of the crank of the other axle, when one of the wheels encounters and passes an obstruction.

A further object is to provide adjusting devices whereby the furrow wheel axle may be so adjusted as to cause the furrow wheel to run on the mound thrown up on the ground when a previous furrow had been made, when the plow is operated in a vineyard where spaces between the rows are narrow, said adjusting devices thus providing means whereby the plow may be leveled under the conditions stated.

With these and other objects in view, the invention consists in certain novel features of construction and combinations of parts as hereinafter set forth and pointed out in the claims.

In the accompanying drawings; Figure 1 is a plan view of a plow embodying our invention; Fig. 2 is a side elevation of a portion of the plow, and Fig. 3 is a sectional view showing the furrow wheel adjustment.

1 represents a plow frame, comprising a plurality of beams 2, 2, suitably spaced apart and braced, and each beam is provided at its rear end with a standard 4, to which a plow base 5 is secured.

Brackets 6, 7, are secured to the beams 2, 2 and are provided with bearings 8, 9 for a crank axle 10. The crank of this axle projects in a forward direction and on its spindle portion, a land wheel 11 is mounted. A bearing sleeve 12 is secured to the crank axle 10, through the medium of lugs 13 clamped to said axle by bolts 14, and also preferably keyed thereto. The sleeve serves as a bearing for a crank axle 15, the crank of which projects forwardly and on its spindle portion, a furrow wheel 16 is mounted.

A shaft 17 is mounted on the frame 1, (transversely of the latter) and on the bearing of the projecting end portions of this shaft, the hubs 18 of levers 19 are mounted,— said levers being adapted at their lower ends to engage the cranks of the axles 10 and 15 and said levers are operated by threaded shafts 20 to adjust the plow for depth of plowing. These depth adjusting devices do not however constitute part of our present invention as defined in the claims and hence need not be further explained herein,—said depth adjusting devices being described and claimed in application filed October 17, 1919 by E. M. Heylman and designated by Serial No. 331,288.

Suitable means will be provided for raising the plow frame,—such, for example, as the power lift mechanism disclosed in Letters Patent to L. W. Stickley dated June 29, 1920, and designated by No. 1,345,275,—said power lift mechanism being connected with the crank axle 10 for operating the same to raise the plow, and suitable means may also be provided, as disclosed by the same patent, for locking the plow frame in elevated position.

It will be observed that the crank axle 15 is movable independently of the crank axle 10 but both of said axles must move together when the plow frame is being raised. This is accomplished through the coöperation of an arm 21 movable with the axle 10 and an arm 22 secured to the axle 15.

The arm 22 is of sufficient length to engage a part on the plow frame and act as a stop to limit the movement of the furrow wheel axle in one direction. In the present instance the stop arm 22 may engage the hub of one of the levers 19. As the furrow wheel axle 15 is movable independently of the land wheel axle, there will be a possibility of the furrow wheel kicking back when it encounters and passes an obstruction, while the plow frame is raised and the crank of the axle 15 is in more nearly a vertical position than when the plow is in working position. Should such kicking back of the furrow wheel be sufficient to cause the crank of the axle 15 to become disposed at a reverse angle to that of the crank of the axle 10, the plow frame could not drop to working position. Such an occurrence will be prevented by the coöperation of the stop arm 22 with the frame,—said stop arm operating to prevent such kicking back of the furrow wheel and its axle should said furrow wheel encounter an obstruction while the plow frame is in raised position.

The arm 21 which moves with the axle 10 may be made an an integral part of one of the lugs which connect the bearing sleeve 12 with said axle and said arm 21 coöperates with a stop member 23 carried by the stop arm 22. The said stop member may consist of a short bar disposed at an angle to the arm 22 and provided with an elongated slot 24 for the passage of a bolt 25 which secures said stop member or bar to said arm 22. The stop member or bar 23 is thus adjustably secured to the arm 22 and by adjusting said stop member or bar 23, the furrow wheel may be raised above the plane of the land wheel so that said furrow wheel may run upon a mound which had been thrown up on the ground by the making of a previous furrow, and the plow can be leveled accordingly. Such adjustment of the furrow wheel is valuable when the plow is being worked in vineyards where the space between the rows is narrow.

Having fully described our invention what we claim as new and desire to secure by Letters-Patent, is:—

1. In a plow, the combination with a plow frame, two independently movable crank axles, one of which is freely movable relatively to the other when the plow is in raised position, and wheels, of a stop arm carried by the axle which is so movable and coöperable with the frame to prevent the wheel on said axle from kicking back sufficiently to cause the crank of said axle to become disposed at an angle reverse to that of the crank of the other axle.

2. In a plow, the combination with a plow frame, two independently movable crank axles, and land and furrow wheels of arms movable with the respective crank axles, and a member adjustable on one of said arms relatively to the other arm.

3. In a plow, the combination with a plow frame, a land wheel crank axle, an independently movable furrow wheel crank axle, and wheels on said axles, of an arm movable with the land wheel axle, an arm movable with the furrow wheel axle and adapted to engage a part on the frame to form a limiting stop, and a stop member carried by said last-mentioned arm and adjustable thereon relatively to the arm on the land wheel axle.

In testimony whereof we have signed this specification in the presence of two subscribing witnesses.

EDWARD M. HEYLMAN.
ARTHUR D. GALLAGHER.

Witnesses:
EDWIN NICAR,
GEORGE R. LANPHERE.